J. W. COCHRAN.
Revolver.
No. 2,211
Reissued Mar. 27, 1866.
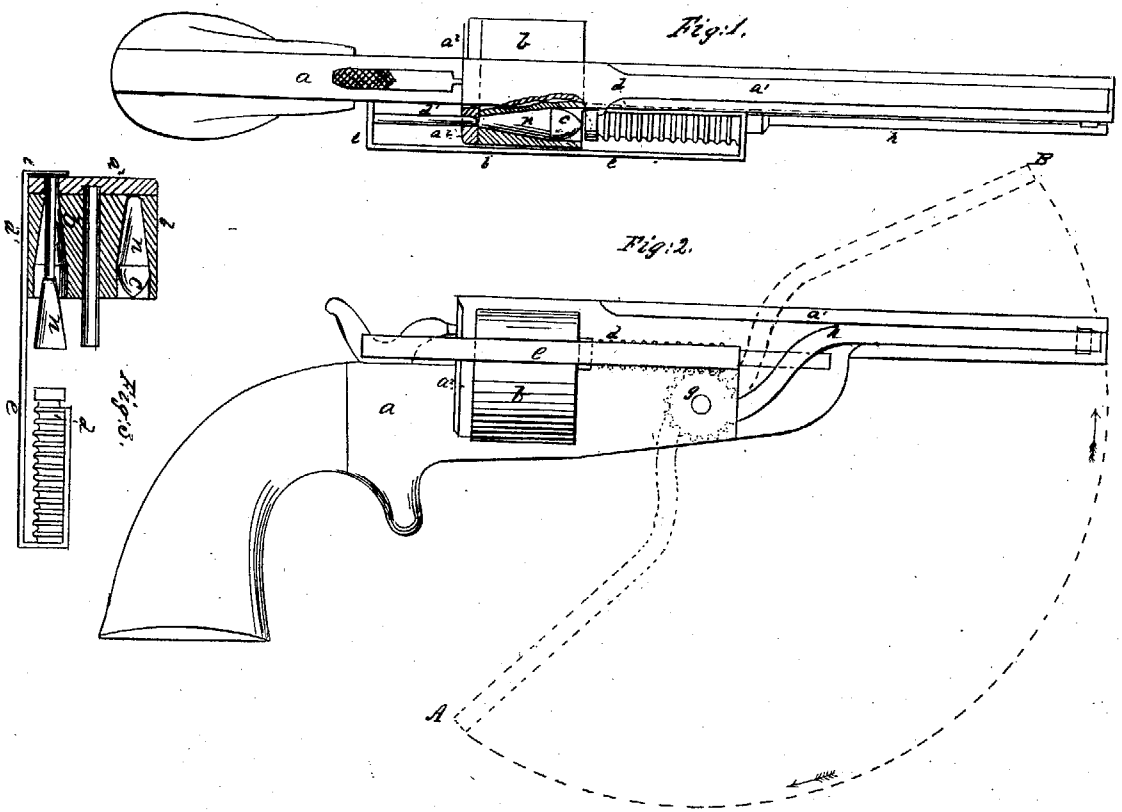
Witnesses:
A. Leclerc
J. W. Coombs
Inventor:
J. W. Cochran
N. PETERS, PHOTO-LITHOGRAPHER, WASHINGTON D. C.

UNITED STATES PATENT OFFICE.

JOHN WEBSTER COCHRAN, OF NEW YORK, N. Y.

IMPROVEMENT IN REVOLVING FIRE-ARMS.

Specification forming part of Letters Patent No. 40,533, dated November 10, 1863; Reissue No. 2,211, dated March 27, 1866.

*To all whom it may concern:*

Be it known that I, JOHN WEBSTER COCHRAN, of the city, county, and State of New York, have invented a new and useful Improvement in Revolving Fire-Arms; and I do hereby declare that the following is a full, clear, and exact description of the same, reference being had to the accompanying drawings, forming part of this specification.

My invention relates to revolving fire-arms which load in front of the cylinder, and from which the discharged cartridge-shells are expelled in a forward direction. It consists in the attachment to the frame or stock of the fire-arm of a piston or plunger working through an opening in the recoil shield and entering the chambers of the cylinder for the purpose of pushing out the cartridge-shells or cartridges. It also consists in the connection of such piston or plunger with the rammer for pushing the cartridges home into the chambers in loading, whereby the said piston or plunger and rammer are both worked by one lever.

Figure 1 in the drawings is a top view of a pistol, showing part of the cylinder in section. Fig. 2 is a side view of the same. Fig. 3 exhibits a horizontal section of the cylinder and recoil-shield, and a top view of the unloading or cartridge-shell-expelling piston or plunger and the loading-rammer.

Similar letters of reference indicate corresponding parts in the several figures.

*a* is the frame of the pistol, *a'* the barrel, *b* the cylinder, and $a^2$ the recoil-shield.

*c c* are the chambers of the cylinder for receiving the cartridges. These chambers are represented as tapering in a rearward direction to receive cartridges of corresponding form; but this form is not essential to my invention.

*d* is the rammer or piston for loading or ramming the cartridges into the chambers.

*d'* is the piston or plunger at the rear of the cylinder for expelling the blanks or shells of the cartridge, or the cartridges themselves, in a forward direction, from the chambers when the cylinder is in such position that one chamber is free to receive another cartridge. The piston *d'*, which has pushed the blank out and being still in the chamber, of course moves back out of the cylinder at the same time the cartridge is going down into the chamber. The rammer *d* and piston *d'* are held and moved back and forth by a connecting bar or yoke, *e*, attached to their outer ends, and passing outside of the cylinder. Rammer *d* is supported in a dovetailed slot or groove to hold and guide it into the chamber. Piston *d'* is supported at one end by passing through a hole in the recoil-plate, or it may be held together with yoke *e* in any convenient manner on the side of the handle or frame of the pistol, out of the way of the hand or the working of the lock or cylinder.

The rammer-piston *d'* and connecting-bar represented make a kind of sliding frame, moved and worked by a gear-wheel, *g*, gearing into a rack or teeth made on the rammer *d*, to which is attached lever *h* for moving the whole backward, and thereby load and unload with one operation of lever *h*. When the cylinder is ready for firing, the lever *h* is held at the center of the barrel, and at the front both the rammer and the piston *d* are out of the chamber, and the cylinder is free to turn. The dotted lines indicate the movement the lever *h* makes to perform its functions in loading and unloading. First, it is moved down in the direction of the black arrow to A. By this motion the rammer *d* is brought back sufficiently to allow the blank cartridge to be thrown out by the piston *d'*, which is of course brought into the chamber and forces the blank out. Then a new cartridge is dropped into the recess in front of the piston *d*, and opposite the chamber. When the lever *h* is moved in the direction of the red arrow, and when it has reached the point at B, the cartridge has been forced home. When the lever *h* is brought back to the center, and in line with the barrel, then the cylinder is free to turn. This mode of attaching the rammer and unloading-piston is particularly intended for the use of my conical cartridge and chamber, but the same principle would be applied to a revolver that is loaded from the base or back of the cylinder with the common cartridge by changing the rammer and unloading-piston and reversing the motion of lever *h* that it may work the loading-rammer from the back and the unloading-piston from the front.

What I claim as my invention, and desire to secure by Letters Patent, is—

1. The unloading and cartridge-shell-expelling piston or plunger $d'$, attached to the frame of the fire-arm, so as to work through the recoil-shield, substantially as and for the purpose herein specified.

2. The unloading piston or plunger $d'$ and loading-rammer $d$, connected by a bar or yoke, $e$, to operate substantially as and for the purpose herein specified.

J. W. COCHRAN.

Witnesses:
J. W. COOMBS,
HENRY T. BROWN.